(No Model.)
C. W. MILLER.
SADDLE FOR HARNESS.
No. 595,400. Patented Dec. 14, 1897.
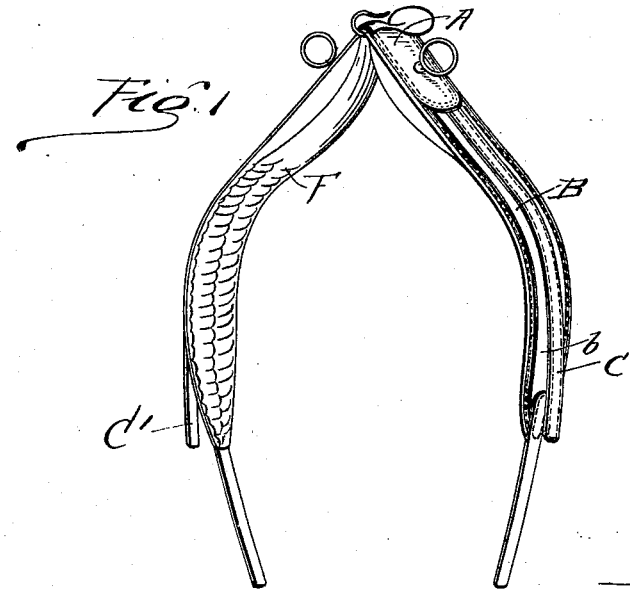
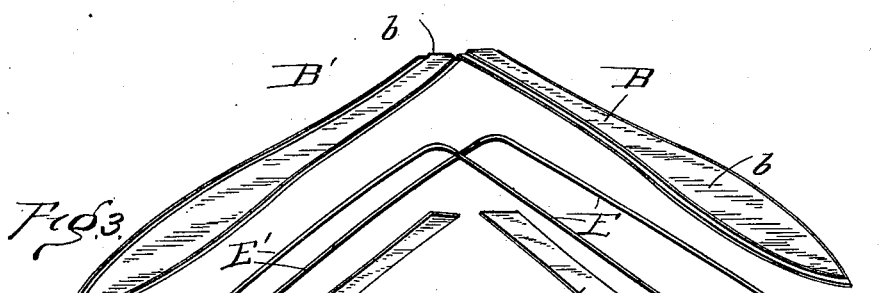
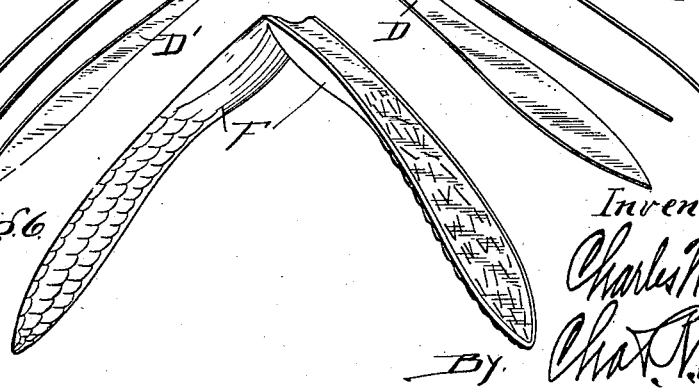
Witnesses
C. J. Cross.
Chas M Ball
Inventor.
Charles W. Miller
By Chas P. Miller
Atty.

UNITED STATES PATENT OFFICE.

CHARLES W. MILLER, OF CANTON, OHIO.

SADDLE FOR HARNESS.

SPECIFICATION forming part of Letters Patent No. 595,400, dated December 14, 1897.

Application filed June 3, 1897. Serial No. 639,269. (No model.)

*To all whom it may concern:*

Be it known that I, CHARLES W. MILLER, a citizen of the United States, and a resident of the city of Canton, county of Stark, State of Ohio, have invented a new and useful Improvement in Saddles for Harness, of which the following is a full, clear, and exact description, reference being had to the accompanying drawings, making part of this specification.

My invention relates to improvements in saddles for harness; and the object is to provide a skirt the upper plane of which shall be above the line of the welt or edges thereof, so as to prevent the trace from wearing or abrading the welt or edge of the saddle when in use, as will be hereinafter more fully described and set forth. I attain this object by the means illustrated in the accompanying drawings, in which—

Figure 1 is a perspective view of the harness-saddle with the parts all assembled in position ready for use. Fig. 2 is a cross-section of the lower part of a harness-saddle. Fig. 3 is a detailed perspective view of the skirts. Fig. 4 is a perspective view of the rattans which, when covered with leather, form the facing or welts. Fig. 5 is a perspective view of the linings. Fig. 6 is a perspective view of the pad.

Similar letters refer to similar parts throughout the several views.

A represents the tree of the saddle, which may be of any desired or well-known form, to which there are attached the skirts B B', which consist of single pieces of leather, the central portions of which have been pressed up and out, so that the upper plane thereof is above the line of the edges thereof, thus forming a wide plane or surface upon which the shaft-bearers C C' rest and may move laterally. The skirts B B' have first been cut in shape to conform to the desired size and shape of the finished saddle. The leather is then pressed to the form heretofore described. Underneath the raised portion $b$ of the skirts, and to prevent depression, there are placed the pads D D', and to the edges of the skirts there are attached the leather-covered rattan facings or welts E E', and underneath these there is provided the usual pad F, which may be constructed in any of the well-known forms. The edges are then stitched together, forming a complete harness-saddle.

Heretofore in the various forms of heavy harness-saddles the parts have been so assembled in their relation to each other that in the swaying movement of the shaft-bearers and trace incident to their use the edges or facings of the saddle have rapidly become worn. My invention overcomes this difficulty, and the line of the plane of the face of the skirt being above that of the facings or welts permits of the swaying or swinging of the shaft-bearers and trace, and at the same time protects the facing from wear or abrasion.

Having thus fully described my invention, what I claim, and desire to secure by Letters Patent, is—

1. The combination in a harness-saddle of a harness-tree, skirts having the body thereof raised above the plane of the edges, supporting-pads, or filling, conforming in shape to the raised body of the skirts, welts attached to the edges of the skirts, and pads attached to the under side of the skirts, substantially as described and for the purpose set forth.

2. A skirt for harness-saddles having the body raised above the plane of the edges thereof, a filling conforming in shape to the raised body of the skirt and held in position by means of a pad attached to the under side of the skirt, substantially as described and for the purpose set forth.

In testimony whereof I have hereunto set my hand this 28th day of May, A. D. 1897.

CHARLES W. MILLER.

Witnesses:
CHAS. R. MILLER,
BURT R. MILLER.